Oct. 20, 1970 — M. JORDAN ET AL — 3,534,938
REAR VIEW MIRRORS
Filed March 1, 1968 — 2 Sheets-Sheet 1
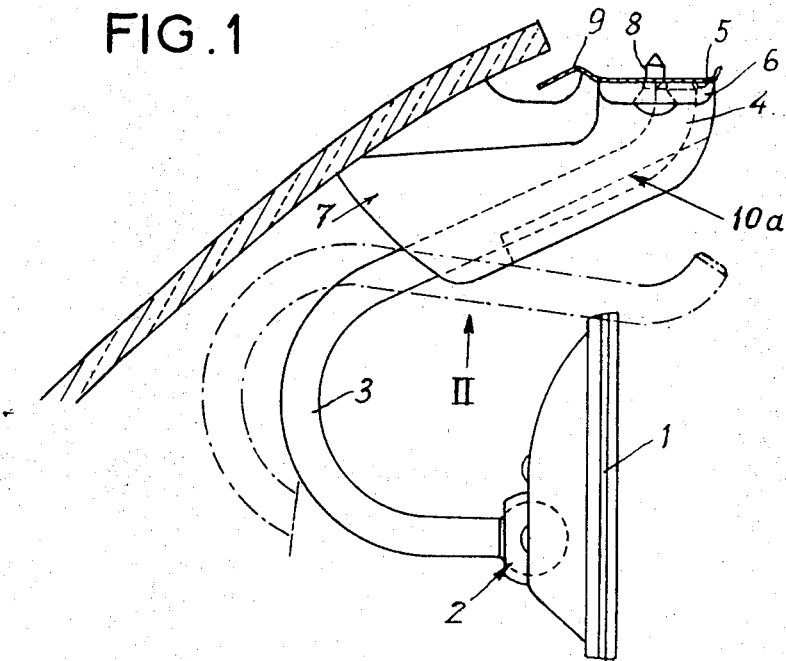
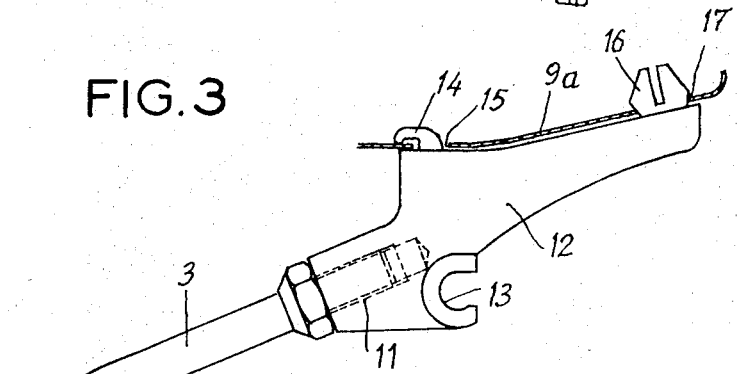
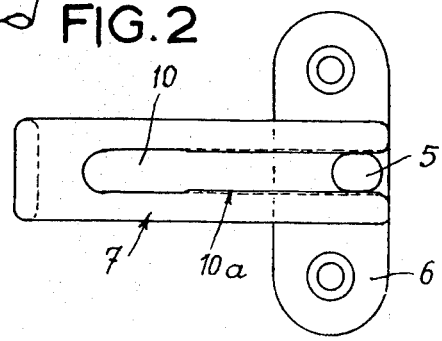
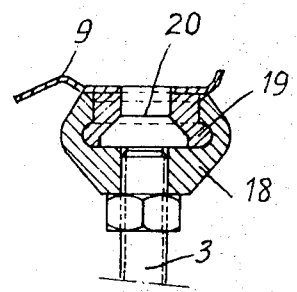

Oct. 20, 1970  M. JORDAN ET AL  3,534,938
REAR VIEW MIRRORS
Filed March 1, 1968  2 Sheets-Sheet 2

United States Patent Office 3,534,938
Patented Oct. 20, 1970

3,534,938
REAR VIEW MIRRORS
Michel Jordan, Bernard Boyenval, Jean-Louis Tanguy, Edmond Zajac, and Georges Sandré, Billancourt, France, assignors to Regie Nationale des Usines Renault, Billancourt, France, and Automobiles Peugeot, Paris, France
Filed Mar. 1, 1968, Ser. No. 709,750
Claims priority, application France, Mar. 30, 1967, 100,902
Int. Cl. B60r 1/04
U.S. Cl. 248—484                   1 Claim

ABSTRACT OF THE DISCLOSURE

A rear view interior mirror for a vehicle comprising a mirror casing formed with a socket for receiving a corresponding positioning ball carried by one end of a supporting rod having its opposite end secured to the vehicle, characterised in that this opposite end is secured by using means capable of yielding in case a predetermined effort is exerted on the mirror and rod assembly so as to release same.

---

This invention relates to rear view interior mirrors for automotive vehicles and has specific reference to the mounting thereof on the windshield frame structure in order to better meet safety requirements and regulations than hitherto known devices.

According to these regulations and requirements, when a rear view mirror is likely to be struck by the head of a driver or passenger of the vehicle, the mounting must compulsorily break, retract or be detached under a predetermined force.

Various rear view mirror constructions are already known which meet these requirements but in most cases the mounting consists of a rod secured to the windshield frame, the rear view mirror being pivotally mounted to the end of this rod by means of a ball-and-socket joint so disposed that in addition to the usual adjustment permitted by this joint, the mirror can retract by tilting in case of shock.

However, this known arrangement is attended by various inconveniences. In fact, the mirror is still likely to break up in case of shock and thus release dangerous glass splinters; moreover, it may also happen, in case of crash, that if the rear view mirror were released from its mounting at the level of said ball-and-socket joint, the fixed and rigid rod constituting said mounting will constitute, in the impact zone of the head, a likewise very dangerous element.

It is the object of the present invention to avoid the inconveniences broadly set forth hereinabove by providing a rear view interior mirror for automotive and other vehicles, of the type comprising a casing having a recess for receiving the ball of a positioning ball-and-socket joint carried by one end of a rod having its opposite end secured to the vehicle, this mirror being characterised in that said opposite end of the rod is secured to the vehicle by using means adapted to yield under a predetermined effort, in order to release immediately the mirror and rod assembly.

Various forms of embodiment of this invention will now be described by way of example with reference to the accompanying drawing, in which:

FIG. 1 is a side elevational view of a rear view mirror mounting;

FIG. 2 is a detail view from beneath, i.e. as obtained when looking in the direction of the arrow II of FIG. 1, showing the member for securing the mirror supporting rod;

FIG. 3 is a side elevational view of another rear view mirror;

FIG. 4 is an axial section showing a typical mounting of the rear view mirror supporting rod;

Figure 5:
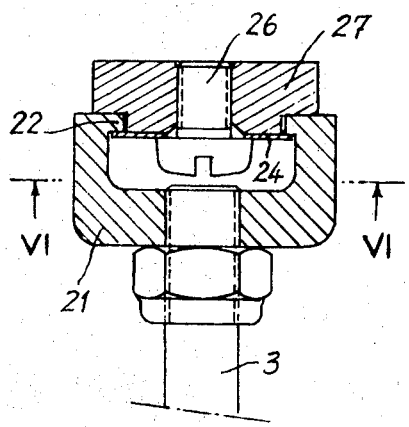
FIG. 5 is an axial section showing another rod mounting.
Figure 6:
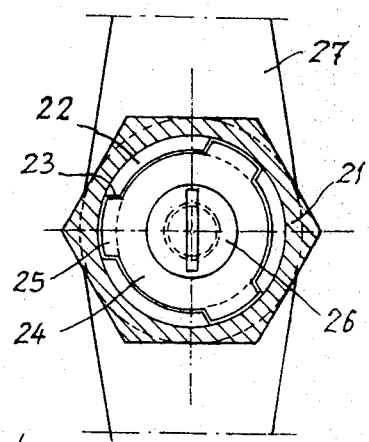
FIG. 6 is a section taken along the line VI—VI of FIG. 5.

In the form of embodiment of the rear view interior mirror shown in FIGS. 1 and 2 of the drawings the casing 1 of the mirror proper is swivel-mounted by means of a ball-and-socket joint 2 on one end of a supporting rod 3 having its opposite end bent at 4 and adapted to engage an orifice 5 formed in the base plate 6 of a bracket 7 secured by means of screws 8 to the frame structure 9 surrounding the windshield.

The bracket 7 consists of moulded plastic material and comprises a groove 10 accommodating part of the rod 3, in this case in a zone 10a, so as to retain this rod by wedging.

Thus, when an impact is applied to the rear view mirror, the rod 3 thereof is released from the bracket 7 by tilting until it is completely free and outside the zone 10a, as shown in dot-and-dash lines in FIG. 1.

In the alternate form of embodiment illustrated in FIG. 3 the rod 3 is secured by means of a screw-threaded end portion 11 into a plastic bracket 12 also acting as a support to a sun visor or glare shield (not shown). It comprises to this end a groove 13 constituting a clamp for the sun visor stiffening rod.

The bracket of this rear view mirror is secured by means of a hook 14 moulded integrally with the bracket and adapted to engage a corresponding recess 15 formed in the windshield frame structure 9a, and also by means of at least one staple 16 moulded integrally with said bracket and adapted resiliently or snappily to fit in a retaining recess 17 also formed in said frame structure 9a.

In the modified form of embodiment illustrated in FIG. 4 the screw-threaded end of rod 3 is screwed in a plastic grommet 18 resiliently fitting on a support 19 also of suitable plastic material, secured for example by means of screws 20 or by other means such as staples, clips or the like in the windshield frame 9.

The grommet 18 and support 19 may have an elongated configuration or, if desired, a part-spherical configuration so as to act as a ball-and-socket joint.

Another form of embodiment of this invention is proposed in FIG. 5 wherein a nut 21 is screwed on the screw-threaded end of rod 3. This nut comprises an inner flange 22 in which spaced notches 23 are formed, and is adapted to cooperate with an elastic washer 24 comprising radial projections 25 adapted to fit in said notches 23.

This washer 24 is secured by means of a screw 26 to the underface of a base plate or bracket 27 adapted in turn to be secured to the windshield frame structure. Thus, rotating the nut 21 in relation to the base plate 27 and therefore to the washer 24 (for example through 60°) will secure the rear view mirror in position.

In this arrangement, when an impact is directed against the rear view mirror the relatively thin projections 25 of washer 24 yield and the nut 21 is released.

Figure 7:
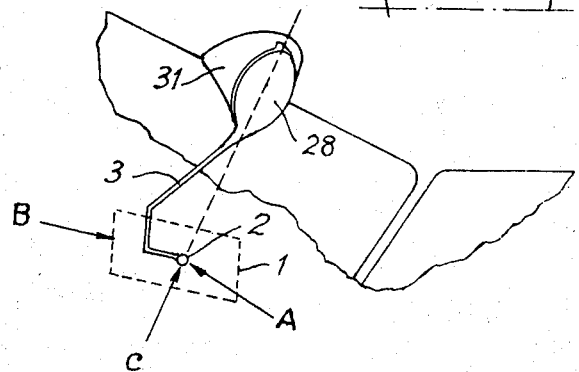
FIG. 7 is a diagrammatic comprehensive view of another rear view mirror mounting.
Figure 8:
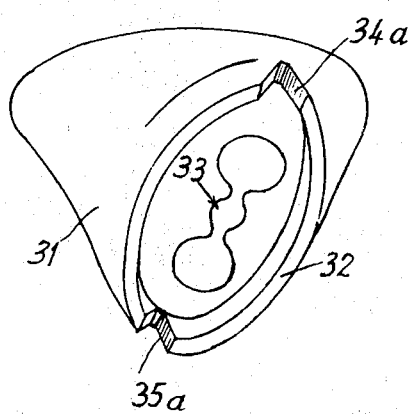
FIG. 8 is a detail view showing in perspective one portion of the mounting of FIG. 7.
Figure 9:
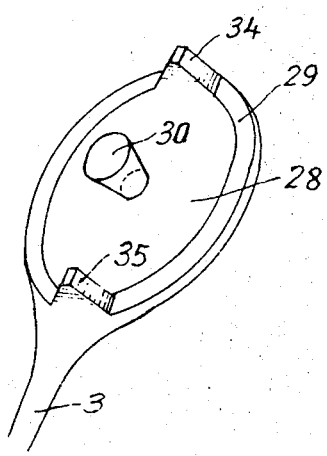
FIG. 9 is a similar view of another portion of the mounting of FIG. 7.

In another form of embodiment illustrated in FIGS. 7 to 9 the mirror 1 can swivel by means of a ball-and-socket joint 2 on one end of a supporting rod 3 having its opposite end rigid with a disk-shaped element 28 comprising an annular bearing portion 29 and a central frusto-conical projection 30. The ball-and-socket joint 2 lies substantially in the plane of said bearing portion 29.

A bracket 31 secured to the windshield frame structure 9 comprises a circular bearing portion 32 adapted to register with that of said disk-shaped element 28 and formed with a central pair of resilient jaws 33 adapted to retain the projection 30 when inserted therein (see FIG. 8).

The disk-shaped element 28 has a pair of peripheral projections 34 and 35 formed integrally therein which correspond to and register with notches 34a and 35a formed in said bracket 31.

This assembly operates as follows:

(a) Assuming that an impact or effort is applied in the direction of the arrow A to the rear view mirror, it will be seen that this direction forms a considerable angle with the plane of disk 28; under these conditions the supporting rod 3 acts as a lever and the frustoconical central projection 30 is stripped out from the resilient retaining jaws 33.

(b) Assuming on the other hand that the impact is directed as shown by the arrow B, that is, substantially in the plane of the supporting rod 3, the rotation of disk 28 with respect to its bracket 31 will cause the projections 34, 35 to be cammed out from their notches 34a and 35a, thus releasing the central projection 30 from its retaining jaws.

(c) Alternately, if the effort is directed substantially as shown by the arrow C, i.e. along the straight line connecting the ball-and-socket joint to the disk-shaped element 28, the latter will slip on the bracket 31 and tear the projection 30 out from the jaws 33.

Of course, this invention should not be construed as being limited by the specific forms of embodiment shown and desrcibed herein, since many modifications and variations may be brought thereto without departing from the spirit and scope of the invention. Thus, for example, the rear view mirror supporting rod 3 may be secured to the vehicle by using a magnet or an adhesive adapted to yield under a predetermined effort for releasing the mirror and rod assembly from its support or supporting structure.

What is claimed is:

1. A rear view interior mirror for a vehicle comprising a supporting rod having a positioning ball on one end thereof and means on the other end for securing said rod to said vehicle, a mirror casing formed with a socket for receiving said positioning ball therein, said securing means comprising a disk-like member fixed on said other end of said rod and a bracket member fixedly attached to said vehicle, said members being provided with circular bearing faces formed with registering and co-acting projections and camming notches, on the one hand, and a central projection carried by one member and engageable in a pair of resilient retaining jaws formed in the other member, on the other hand, whereby said securing means is capable of yielding upon application of a predeterimned force on the mirror and rod assembly so as to release same from attachment to the vehicle.

References Cited

UNITED STATES PATENTS 2,860,545   11/1958   Herr et al. _____ 248—478

FOREIGN PATENTS 1,084,850   9/1967   Great Britain.
1,096,178   12/1967   Great Britain.

OTHER REFERENCES

Happich, German Printed Application, Ser. No. H25898, Printed May 30, 1956, KL 63c 91, 2 pp. Spec.

ROY D. FRAZIER, Primary Examiner

F. DOMOTOR, Assistant Examiner

U.S. Cl. X.R.

248—223